United States Patent Office 3,582,396
Patented June 1, 1971

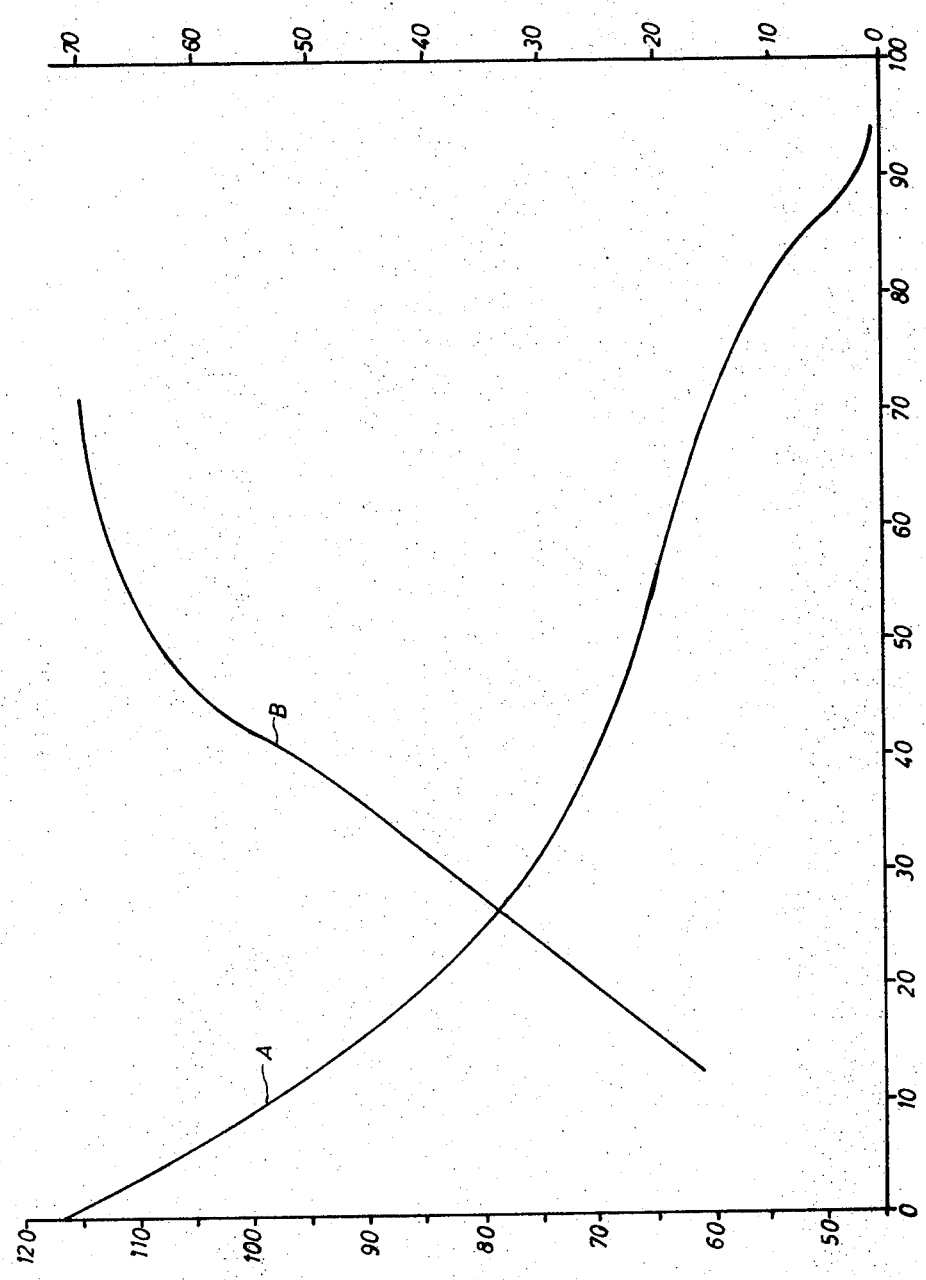
KLAUS KÖNIG, HARRO TRAUBEL, ARTUR REISCHL, BRUNO ZORN.

3,582,396
POLYURETHANE MICROPOROUS SHEET STRUCTURES AND A PROCESS FOR THE PREPARATION THEREOF
Klaus König, Leverkusen, Harro Träubel, Leverkusen-Kueppersteg, Bruno Zorn, Cologne-Flittard, and Artur Reischl, Leverkusen, Germany, assignors to Farbenfabriken Bayer Aktiengesellschaft, Leverkusen, Germany
Filed July 31, 1968, Ser. No. 749,154
Claims priority, application Germany, Aug. 9, 1967,
F 53,184
Int. Cl. C08j 1/14; B32b 3/00
U.S. Cl. 117—135.5               4 Claims

ABSTRACT OF THE DISCLOSURE

Polyurethane microporous sheets are prepared by reacting an organic compound containing at least two terminal hydroxyl groups and having a molecular weight of from about 500 to about 10,000, and a chain lengthening agent containing at least two hydroxyl or amino groups and having a molecular weight of from about 50 to about 600, the reactive groups of this extender being within a factor of 5 as compared to the reactivity of the hydroxyl groups of the compound having a molecular weight of from 500 to 10,000, and an organic polyisocyanate in an amount such that the NCO to OH or the NCO to amino plus hydroxyl ratio is from about 0.8 to 2, the reactants forming a product which when in a homogeneous state exhibits a Shore A hardness of at least 50 and a tensile strength of at least 50 kg./cm.$^2$, the reaction being conducted in a 10 to 80 percent by volume solution at a temperature of up to about 150° C., the solvent or mixture of solvents of the solution exhibiting the following criteria:

(a) dissolves the starting material at the initial reaction temperature,
(b) dissolves the polyurethane being formed less and less readily as the degree in polyaddition increases and finally permits the polyurethane to gel after not more than 20 minutes under the reaction conditions,
(c) does not cause substantial swelling of the resulting polyurethane, and
(d) has an evaporation number high enough to insure its presence in sufficient quantity under the reaction conditions until the film solidifies.

This invention relates to the preparation of polyurethane microporous sheet structures and to a method of preparation.

The production of completely reacted polyether polyurethanes in hydroscopic, highly polar solvents is known. Microporous films can be produced from such solutions by washing out the solvent with water (see German Auslegeschrift No. 1,110,607). Disadvantages of such processes are that the solvents are toxic, expensive and difficult to recover from the aqueous solutions. The production of homogeneous nonporous foils or lacquers from the same or similar starting materials in solution in organic solvents is also known (O. Bayer, Angewandte Chemie 59 (1947) 263). The production of pulverulent polyurethanes in organic solution is also known (DRP 728 981).

However, no industrial use has so far been found for these products.

It was to be expected from the state of the art that synthesis of polyurethanes in organic solvents would always lead, after removal of the solvent, either to homogeneous or nonporous films or lacquers, or to pulverulent products.

It is therefore an object of this invention to provide improved polyurethane microporous sheet structures. It is another object of this invention to provide an improved and simplified method of making polyurethane microporous sheet structures. It is still another object to provide polyurethane sheet structures having improved permeability to water vapor.

The foregoing objects and others which will become apparent from the following description, when considered in connection with the accompanying graph, are accomplished in accordance with the invention, generally speaking, by providing polyurethane microporous sheets by reacting an organic compound containing at least two terminal hydroxyl groups and having a molecular weight of from about 500 to about 10,000, and a chain lengthening agent containing at least two hydroxyl or amino groups and having a molecular weight of from about 50 to about 600, the reactivity of the reactive groups of this extender being within a factor of 5 as compared to the reactivity of the hydroxyl groups of the compound having a molecular weight of from 500 to 10,000, and an organic polyisocyanate in an amount such that the NCO to OH or the NCO to amino group ratio is from about 0.8 to 2, the reactants forming a product which when in a homogeneous state exhibits a Shore A hardness of at least 50 and a tensile strength of at least 50 kg./cm.$^2$, the reaction being conducted in a 10 to 80 percent by volume solution at a temperature of up to about 150° C. the solvent or mixture of solvents of the solution exhibiting the following criteria:

(a) dissolves the starting material at the initial reaction temperature,
(b) dissolves the polyurethane being formed less and less readily as the degree in polyaddition increases and finally permits the polyurethane to gel after not more than 20 minutes under the reaction conditions,
(c) does not cause substantial swelling of the resulting polyurethane, and
(d) has an evaporation number high enough to insure its presence in sufficient quantity under the reaction conditions until the film solidifies.

The reaction mixture is applied to a support while still pourable, and the polyaddition is completed at a temperature below the softening point of polyurethane with simultaneous removal of the solvent.

Starting materials which are suitable for the process according to the invention are higher molecular weight compounds which contain at least two terminal OH groups, for example, polyethers, polyesters, polycarbonates, polyacetals, polythioethers and siloxanes. Such products have been described, for example, in J. H. Saunders and K. C. Frisch "Polyurethanes" I, New York (1962), pp. 32 to 61 and in the literature cited therein and also in U.S. Pat. No. 3,351,608.

Suitable low molecular weight chain lengthening agents containing at least two OH or NH groups are, for example, diols or polyols, or polyamines the reactivity of which has been inhibited and also set forth in the above-mentioned patent.

The usual polyisocyanates (as described for example by W. Siefken, Liebigs Ann. Chem. 562, 75–136 (1949)) are suitable for the process as well as high molecular weight reaction products which contain at least two NCO groups per molecule (the so-called prepolymers which have an NCO/OH ratio $\geq 2$) prepared from the above-mentioned OH-containing compounds and excess polyisocyanates. It is advantageous to use as solvents organic compounds which have a boiling point below 250° C. and are liquid under the reaction conditions, and which will not react with the starting materials under the reaction conditions. Suitable solvents are, for example, aliphatic hydrocarbons such as pentanes and hexanes and its homologues such as cycloalkanes which may be alkylated such as cyclohexane, methylcyclohexane and cyclododecane. Petroleum fractions, especially mixtures of aliphatic hydrocarbons with boiling points between 80 and 250° C., which are suitable are: e.g. ligroin, petroleum hydrocarbon cleaning grade, white spirit, mepasin and turpentine oils, mixed aliphatic-aromatic hydrocarbons such as tetralin or Decalin, aromatic hydrocarbons such as benzene, toluene, xylene, ethyl benzene, diethylbenzene or mesitylene, chlorinated hydrocarbons such as di-, tri- and tetrachloromethanes, di-, tri- and perchloroethylenes, di-, tri-, tetra-, penta- and hexachloroethanes, 1,2- and 1,3- dichloropropanes, i-butyl chloride, dichlorohexane, chlorocyclohexane, chlorobenzene and chlorotoluene, ethers such as di-n-propylether, di-i-propylether, di-n-butylether, ethyl propyl ether, anisole and phenetole, esters such as diethyl carbonate, dimethyl carbonate, ethyl acetate, propyl acetate, butyl acetate, amyl acetate, hexyl acetate, methoxybutyl acetate, methyl propionate, ethyl propionate, methyl glycol acetate and dimethyl oxalate, and ketones such as acetone, methyl ethyl ketone, methyl-i-butyl ketone, methoxyhexanone, mesityl oxide, phorone and cyclohexanone.

The term "solvent" as defined herein means a liquid which dissolves the "monomeric" starting compounds, i.e. the compound having terminal hydroxyl groups and the organic polyisocyanate and is a non-solvent for the polyaddition product formed. The solvent should also not swell the polyaddition product appreciably, though it is possible to use non-swelling and swelling solvents in mixture.

The reaction of the starting materials can be catalyzed with known isocyanate polyaddition catalysts (see J. H. Saunders and K. C. Frisch "Polyurethanes" I, New York (1962) page 212). It is preferable to use volatile tertiary amines because, as is well known, these produce end products which are more resistant to hydrolysis.

The process is preferably carried out as follows: the OH-containing, and if desired NH-containing, components are dissolved in the solvent or solvent mixture, and the polyisocyanate, which may also be in solution, is stirred in at the required temperature, and catalyst is then added to the mixture if this is desired. The heat generated by the polyaddition reaction increases the temperature of the mixture. The solution generally becomes cloudy after a time, and this cloudiness is accompanied by an increase in viscosity of the solution. The solution is then poured out on to a porous or nonporous support. The solution starts to gel after 20 minutes, or less. Reaction mixtures with lower gelling times could, of course, be used, but these are of little technical interest. The polyaddition is preferably allowed to go to completion on the support in a drying cupboard at a temperature of more than 60° C. This results in the solidification of the film at the same time and the solvent is evaporated off then or immediately afterwards. The process can also be carried out at lower temperatures, but the reaction time is increased.

If the microporous sheet is produced on nonporous supports, it is then glued on to woven or knitted fabrics, fleeces, split leather etc. by means of discontinuous layers of adhesive. Sheet structures which are produced directly on a porous support or glued to it can be finished and worked up by the usual methods employed for synthetic leather.

The composition of starting materials must be so adjusted that the polyurethane produced has a Shore hardness A of more than 50, preferably 60 to 100, a tensile strength of more than 50 kp./cm.$^2$, preferably more than 200 kp./cm.$^2$ and a softening range above 100° C., preferably above 130° C., when it is in the form of a homogeneous, nonporous structure. The Shore hardness A is determined according to DIN 53505. The softening range can be determined according to a known procedure, e.g. on a Kofler block (see Houben-Weyl (1953) "Analytische Methoden" 789, 792).

Suitable recipes for polyurethanes are to be found in the literature, e.g. E. Muller et al. "Angewandte Chemie" 64 (1952) 523–531. If recipes that have not been described are considered for use, it is advisable first to produce the polyurethane in bulk by the melt casting process and then to investigate its physical properties.

The difference in reactivity between the higher molecular weight compounds which contain at least two terminal OH groups and the cross-linking agent towards isocyanates should not be too great. The reactivities are preferably equal but the reactivity of the cross-linking agent may be up to about five times and preferably not more than two times greater or less than that of the higher molecular weight compound. The reactivity is taken as the reaction velocity constant expressed as 1/mol sec. (see J. H. Saunders and K. C. Frisch "Polyurethanes" I, New York (1962), pp. 206 and 208).

Solvents suitable for the process according to the invention must be capable of dissolving the starting materials at the starting temperature of the reaction, and this can be determined by a preliminary test.

The solvent to be used should not have a large swelling effect on the mixed polyurethane. This can be tested by placing a circular piece of polyurethane film e.g. of 3 cm. diameter and 0.2 to 0.5 mm. thickness in the solvent, if less than 50 percent by weight (based on the weight of this sample) of the solvent has been absorbed by swelling after 34 hours than the solvent is considered to be suitable. Mixtures of such nonswelling solvents can, of course, be used. In addition, solvents which cause more than 50 percent swelling of the polyurethane may also be included in the mixture. However, such solvents should have a lower vaporization number (e.g. up to about 95%) than the remaining non-swelling solvents, so that they will evaporate more rapidly on drying than the latter. These mixtures actually show the same behavior as pure non-swelling solvents resp. mixtures of solvents. The evaporation time may be determined according to DIN 53170.

A measure of the porosity, and hence of the permeability to water vapor, of a sheet structure is its bulk density. Nonporous polyurethanes are known to have densities of about 1.1 to 1.3 g./cm.$^3$. The corresponding porous polyurethanes should have a bulk density of less than 0.8 g./cm.$^3$, i.e. one-third of the sheet should consist of pores and two-thirds of solid material. This means that when the sheet structure solidifies, after which stage no substantial reduction in volume (shrinkage) of the sheet occurs, the concentration of polymer in the reaction mixture should be not more than 60 to 70 percent, by volume.

The process is not generally carried out under pressure nor in a closed system, so that from the moment when the solution is poured out until the time when the sheet solidifies considerable quantities of solvent can evaporate. The extent to which this solvent loss occurs depends on the reaction and drying conditions and on the evaporation number of the solvent. A large solvent loss is preferably compensated by dissolving the reactants in sufficiently large volumes of solvent. If the process is carried out in a closed system at the saturation vapor pressure of the solvent, a higher initial concentration of reactants can be used.

It is of little technical importance to employ the starting components in concentrations of less than 10 percent by volume, especially as phase separation often occurs as the polyaddition proceeds if the dilutions are too high, and the solvent often separates like a serum after the shaping operation.

Solidification of the film generally occurs after 5 to 40 minutes at reaction temperatures of 80° C., depending on the catalyst and the reactivities of the reactants.

In order to obtain a film with a satisfactory microporosity, it is necessary that the reaction mixture should gel soon after it has been poured out. This is a solidification of the reaction mixture in the form of a gel without phase separation, i.e. without a serum-like exudation of the solvent. The sheet is generally no longer deformable after gelling.

After gelling, increasing solidification occurs due to progressive polyaddition. The course of this solidification can be observed e.g. with a Shore A measuring instrument. If this measuring instrument indicates a Shore hardness A of more than 25, e.g. for a film of 5 mm. thickness, solidification has begun. In accordance with the present process, more than 30 percent by volume of the solvent should still be present in the sheet structure at that moment (see Example 3).

Other polymers, dyes, fillers, stabilizers, cross-linking agents, etc. may be included in this process in the form of solutions, organic dispersions or solids, and these are best incorporated in the starting solutions.

One advantage of this process is the generally wide range of starting components and solvents which can be used. The products produced by the process may be used as filter materials and as porous coatings for textiles etc.

The invention is further illustrated by the following examples in which the parts are by weight unless otherwise specified.

EXAMPLE 1

About 40 parts of a polyester of adipic acid and ethylene glycol of molecular weight 2000 of OH number 56 are dissolved with about 3.6 parts of butane-1,4-diol in about 60 parts by volume of butyl acetate and about 60 parts by volume of xylene (isomeric mixture) and heated to about 75° C. About 18 parts of 4,4'-diphenylmethane diisocyanate are then added. After the addition of about 0.3 part of diaza-bicyclo octane as catalyst, the reaction mixture is stirred with a magnetic stirrer for about 25 seconds, during which time the temperature rises to about 90° C. and the mixture becomes cloudy. After the mixture has been poured out on to a 1000 cm.$^2$ glass plate, it is left at room temperature for about 5 minutes and then heated in a drying cupboard with circulating air at about 75° C. to evaporate off the solvent. A microporous film which has a permeability to water vapor of 6.6 mg./h./cm.$^2$ is obtained. Determination of the permeability to water vapor is described e.g. in "Das Leder" 12 (1961), 86–88 or IUP 15. The experiments summarized in Table 1 are carried out in an analogous manner.

EXAMPLE 2

About 30 parts of an NCO-containing prepolymer of 1 mol of a polypropylene glycol ether of molecular weight 2000 and about 4 mols of 4,4'-diphenylmethyl-diisocyanate (NCO content 8.4 percent) are dissolved in about 20 parts by volume of butyl acetate and about 30 parts by volume of mineral spirits (an aliphatic hydrocarbon mixture of boiling range 160 to 196° C.) and heated to about 70° C. A solution of about 3.88 parts of bis-(hydroxymethyl)-1,4-cyclohexane in about 20 parts by volume of butyl acetate is added with stirring, and the reaction mixture is then treated with about 0.05 part of dibutyl tin dilaurate. After about 14 seconds, the opaque solution is applied to a pitted aluminium plate 2000 cm.$^2$ in area, and then heated for about one hour in a drying cupboard at a temperature of about 80° C. The resulting microporous film has a permeability to water vapor of 2.1 mg./h./cm.$^2$

EXAMPLE 3

About 57.6 parts of a partly branched polyester of adipic acid, diethylene glycol and 6.3 mol percent of 1,1,1-trihydroxymethylpropane (based on diethylene glycol) of molecular weight 1870 and OH number 60 and about 8.1 parts of butane-1,4-diol are dissolved in about 90 parts by volume of butyl acetate and about 90 parts by volume of xylene at about 110° C. After the addition of about 33 parts of 4,4'-diphenylmethane diisocyanate, the reaction mixture is stirred for a further 75 seconds at this temperature and then poured on to a glass plate of 2000 cm.$^2$ area. After this mixture has been left at room temperature for about 2 hours, the solvents are evaporated off at about 60° C. A film having a permeability to water vapor of 2 mg./h./cm.$^2$ is obtained.

In a second test, evaporation of the solvent and the increasing Shore hardness A of the film which solidifies as a result of progressive polyaddition were investigated. The values obtained in relation to time are indicated in the following table. Time "0" was the time when catalyst was added to the reaction mixture.

| Time, minutes: | Weight of film (g.) | Shore Hardness A |
|---|---|---|
| 0 | 117 | [1] |
| 5 | 107 | <10 |
| 10 | 98 | 11 |
| 15 | 90 | 19 |
| 18 | | 24 |
| 20 | 84 | 26 |
| 23 | | 29 |
| 25 | 81 | |
| 27 | | 36 |
| 30 | 76 | 38 |
| 32 | | 40 |
| 34 | | 43 |
| 35 | 72 | |
| 36 | | 46 |
| 38 | | 51 |
| 40 | 70 | 52 |
| 42 | | 56 |
| 44 | | 58 |
| 45 | 68 | |
| 46 | | 60 |
| 48 | | 62 |
| 50 | 66 | 63 |
| 52 | | 64 |
| 54 | | 64 |
| 55 | 65 | |
| 56 | | 66 |
| 58 | | 67 |
| 60 | 64 | 68 |
| 62 | | 69 |
| 64 | | 69 |
| 65 | 61 | |
| 66 | | 70 |
| 68 | | 70 |
| 70 | 60 | 70 |
| 75 | 56 | |
| 80 | 54 | |
| 85 | 54 | |
| 90 | 47 | |

[1] Not measurable.

These values are represented graphically in the figure. The abscissa on the left indicates the weight of 2000 cm.$^2$ of the film in grams, the abscissa on the right the Shore hardness A in degrees, and the ordinate indicates the time in minutes.

Curve A represents the reduction in weight with time and Curve B the increase in Shore hardness A with time.

EXAMPLE 4

About 28 parts of 1,4-butylene glycol-polyether of molecular weight 2800 and about 1.8 parts of butane-1,4-diol are dissolved in about 150 parts by volume of mineral spirit and about 8.75 parts of 4,4'-diphenylmethane diisocyanate are added at about 100° C. After the addition of about 0.1 part of diaza-bicyclo-octane, the temperature of the reaction mixture rises to about 110° C. within about 90 seconds. After the mixture has been poured out onto a glass plate of area 2000 cm.$^2$, it is kept at room temperature for about 15 minutes and finally heated at about 110° C. The resulting film has a permeability to water vapor of 6.7 mg./h./cm.$^2$. The tests summarized in Table 2 are carried out in an analogous manner.

EXAMPLE 5

About 10 parts of a graft polymer of acrylonitrile, butadiene and styrene, about 27 parts of the polyester of Example 3 and about 4 parts of butane-1,4-diol are dissolved in about 100 parts of tetrahydrofuran. About 60 parts by volume of mineral spirit are added with vigorous stirring, and about 0.3 part of diaza-bicyclo-octane is dissolved in the mixture at about 20° C. The temperature of the reaction mixture rises to about 50° C. within about 60 seconds. After the mixture has been poured out onto a silicone rubber matrix of 1500 cm.$^2$ in area, the resulting film is left at room temperature for about 24 hours. The dry film has a permeability to water vapor of 3.5 mg./h./cm.$^2$. The tests summarized in Table 3 were carried out in an analogous manner.

EXAMPLE 6

About 80 parts of a polyester of adipic acid and ethylene glycol of molecular weight 2000 and OH number 56, about 6.3 parts of butane-1,4-diol, about 0.9 part of 1,1,1-trihydroxymethylpropane and about 1.2 part of a finely ground red iron oxide pigment are dissolved or dispersed in about 120 parts by volume of butyl acetate and 120 parts by volume of xylene. About 36 parts of 4,4'-diphenylmethane diisocyanate are added at about 70° C., and about 0.6 part of diaza-bicyclo-octane are added after the diisocyanate dissolved. After the reaction mixture has been stirred for about 30 seconds, it is poured onto glass plates of 2000 cm.$^2$, and after it has been left there for about 5 minutes at room temperature, the solvent is evaporated off at about 75° C. The microporous film obtained has a permeability to water vapor of 7 mg./h./cm.$^2$. In the comparative tests, dyes that are also soluble in organic solvents are used instead of pigments.

EXAMPLE 7

A solution of about 2,178 parts of the polyester of Example 3, about 216 parts of butane-1,4-diol and about 10 parts of diaza-bicyclo-octane in about 2500 parts by volume of butyl acetate is heated to about 70° C. in a storage vessel, and a solution of about 636 parts of phenylene-1,4-diisocyanate in about 3000 parts by volume of xylene and about 500 parts by volume of butyl acetate is heated to about 70° C. in a second storage vessel. The two solutions are supplied at equal rates (100 parts by volume of solution per minute each) into a mixing chamber by means of dosing pumps, and mixed by means of a mechanical stirrer. The mixture flows through a retention chamber where it stays about 20 seconds before flowing out onto a conveyor band made of glass fiber fabric coated with polytetrafluoroethylene. The conveyor band moves through a heating zone in which the solvents are evaporated. About 5 m.$^2$ of microporous film of 1 mm. thickness having a permeability to water vapor of 10.8 mg./h./cm.$^2$ are produced.

A part of this film is glued onto bonded fleece by means of discontinuous layers of adhesive; another part to split leather and a third part to fabric. All three pieces are finished by a usual leather finishing process with aqueous polyurethane dispersions containing a suspension of finely divided pigment particles, and then tested. The permeabilities to water vapor of the individual finished pieces are in the region of 2.5 to 5 mg./h./cm.$^2$, the fastness to abrasion according to Satra (see Pittard, Jour. Soc. Leather Trade Chem. 4, 120–125) is satisfactory. The fastness to hot pressing at 160° C. is also satisfactory and the samples withstand 200,000 bends in the Bally Flexometer (see E. Baumann "Das Leder" 8 (1957) 190) without damage.

EXAMPLE 8

About 18.2 parts of a partly branched polyester of adipic acid, diethylene glycol and triol of OH number 61 (20 mmol OH) are stirred together with about 12.5 parts of diphenylmethane-4,4'-diisocyanate (100 mmol of NCO) in about 130 parts by volume of butyl acetate and about 40 parts by volume of mineral spirit at about 100° C. for about 3 minutes. A hot solution of about 7.7 parts (70 mmol NH) of 4,4'-bis-methylaminodiphenylmethane in about 10 parts by volume of butyl acetate and about 0.2 part of diaza-bicyclo-octane are then added, the reaction mixture is stirred for about 15 seconds and then poured onto a glass plate of about 800 cm.$^2$ in area. The polyaddition reaction is completed in a drying cupboard with circulating air at about 80° C., and the solvent is evaporated. A microporous sheet having a permeability to water vapor of 0.5 mg./h./cm.$^2$ is obtained.

EXAMPLE 9

About 13.7 parts (110 mmol NCO) of diphenylmethane-4,4'-diisocyanate are added at about 80° C. to about 36.4 parts of a partly branched polyester of adipic acid, diethylene glycol and triol of OH number 61 (40 mmol OH) and about 10.7 parts of diphenylether-4,4'-disulphonic acid dihydrazide (60 mmol NH) in about 80 parts by volume of butyl acetate and about 80 parts by volume of xylene at about 80° C. The reaction mixture is stirred for about 60 seconds after the addition of about 0.5 part of diaza-bicyclo-octane and lastly poured onto a metal plate of about 800 cm.$^2$ area. The polyaddition is carried out at about 80° C. with simultaneous evaporation of the solvent. A microporous sheet which had a permeability to water vapor of 1 mg./h./cm.$^2$ was produced.

EXAMPLE 10

About 18.2 parts of a partly branched polyester of adipic acid, diethylene glycol and triol of OH number 61 (20 mmol OH) in about 130 parts by volume of butyl acetate and about 20 parts by volume of mineral spirit are heated to about 100° C. After the addition of about 12.5 parts (100 mmol NCO) of diphenylmethane-4,4'-diisocyanate, the reaction mixture is stirred for about 10 minutes at about 100° C. About 3 parts of dimethylurea (70 mmol NH) and about 0.5 part of diaza-bicyclo-octane are added and the reaction mixture is stirred for about 90 seconds at about 120° C. The reaction mixture is then poured onto a glass plate of about 800 cm.$^2$ and dried at about 80° C. The resulting film has a permeability to water vapor of 3.6 mg./h./cm.$^2$.

The following tests were carried out in accordance with Example 1:

TABLE 1

| Polyester | Parts | Diol | Parts | Polyisocyanate | Parts | Solvent | Parts by volume | Solvent | Parts by volume | Catalyst | Parts | Temperature at which catalyst is added (°C.) | Stirring time (sec.) | Final heating at (°C.) | Permeability to water vapor (mg./h./cm.²) |
|---|---|---|---|---|---|---|---|---|---|---|---|---|---|---|---|
| A | 40 | Butane-1,4-diol | 3.6 | 4,4'-diphenylmethane diisocyanate | 18 | Butyl acetate | 60 | Xylene | 60 | Diazabicyclooctane | 0.1 | 100 | | 20 | 3.6 |
| B | 56.1 | do | 6.3 | do | 32.5 | do | 80 | Mineral spirit | 60 | do | 1 | 80 | 20 | 75 | 1.0 |
| A | 40 | do | 3.6 | do | 18 | Xylene | 200 | | | Dibutyl tin dilaurate | 0.05 | 110 | 10 | 20 | 1.8 |
| C | 57.6 | do | 8.1 | do | 33 | Butyl acetate | 90 | Xylene | 90 | do | 0.1 | 100 | 5 | 75 | 3 |
| C | 28.8 | do | 3.3 | do | 14.5 | Methylene chloride | 30 | Perchloro ethylene | 62 | Triethylamine | 1 | 20 | 120 | 20 | 1.15 |
| C | 28.8 | do | 3.3 | do | 14.5 | do | 60 | do | 90 | do | 1 | 20 | 120 | 20 | 10 |
| C | 54.3 | Hexamethylene glycol(1,6) | 10.4 | do | 33 | Butyl acetate | 90 | Xylene | 90 | Dibutyl tin dilaurate | 0.05 | 70 | 30 | 75 | 1.4 |
| A | 40 | Triethylene glycol | 7.5 | Phenylene-1,4-diisocyanate | 12 | do | 100 | Xylene | 90 | Diazabicyclooctane | 0.1 | 60 | 240 | 75 | 1.5 |
| C | 57.0 | Butane-1,4-diol | 5.4 | Naphthylene-1,5-diisocyanate | 25 | do | 90 | do | 90 | Dibutyl tin dilaurate | 0.1 | 70 | 48 | 80 | 4 |
| B | 37.4 | do | 1.4 | 4,4'-diphenylmethane diisocyanate | 16.5 | 1,2-dichloropropane | 75 | Mineral spirit | 45 | Diazabicyclooctane | 0.1 | 70 | 30 | 80 | 3.6 |
| F | 24 | do | 4.5 | do | 19.3 | Butyl acetate | 50 | Xylene | 55 | do | 0.07 | 70 | 40 | 80 | 1.8 |
| G | 4.15 | do | | | | | | | | | | | | | |
| F | 34.5 | Butane-1,4-diol | 5.4 | do | 22 | do | 60 | do | 65 | do | 0.07 | 70 | 45 | 80 | 2.1 |
| G | 2.5 | | | | | | | | | | | | | | |
| G | 42.5 | {Butane-1,4-diol / 1,1,1-trihydroxymethylpropane} | 4.8 / 0.5 | do | 24 | do | 60 | Mineral spirit | 30/35 | Dibutyl tin dilaurate | 0.05 | 80 | 25 | 80 | 3.6 |
| B | 37.4 | Butane-1,4-diol | 5.4 | 4,4'-diphenylmethane diisocyanate | 26.5 | Butyl acetate | 80 | do | 100 | Dibutyl tin dilaurate | 0.07 | 70 | 22 | 80 | 1 |
| C | 36.2 | do | 5.4 | do | 22 | Chlorobenzene | 62 | Tetralin | 72 | Diazabicyclooctane | 0.07 | 70 | 30 | 80 | 1.3 |
| C | 36.2 | do | 3.6 | Phenylene-1,4-diisocyanate | 10.6 | Butyl acetate | 60 | Xylene | 60 | do | 0.2 | 70 | 30 | 80 | 10 |
| C | 36.2 | do | 3.6 | do | 10.6 | Trichloroethylene | 50 | do | 50 | do | 0.2 | 70 | 15 | 80 | 3.6 |
| C | 36.2 | do | 3.6 | do | 10.6 | 1,2-dichloropropane | 50 | do | 70 | do | 0.2 | 70 | 16 | 80 | 8.4 |
| C | 36.2 | do | 3.6 | do | 10.6 | Butyl acetate | 120 | Diazabicyclooctane | 80 | do | 0.2 | 100 | 10 | 80 | 1.5 |
| C | 36.2 | do | 3.6 | do | 10.6 | 1,2-dichloropropane | 70 | Perchloroethylene | | do | 0.2 | 70 | 15 | 80 | 5 |
| C | 36.2 | 1,4-bis-(hydroxyethoxy)-benzene | 9.9 | do | 19.3 | Butyl acetate | 65 | Xylene | 65 | do | 0.2 | 70 | 20 | 80 | 8.5 |
| C | 18 | di-β-hydroxyethylthioether | 2.4 | do | 5.3 | do | 80 | | | do | 0.1 | 70 | 30 | 75 | 4.0 |

Note.—A=Polyester of adipic acid and ethylene glycol of molecular weight 2,000, OH number 56; B=Polyester of adipic acid, hexane-1,6-diol and neopentyl glycol of molecular weight 1,370, OH number 60; C=Polyester of adipic acid, diethylene glycol and 1,1,1-trihydroxyethylpropane of molecular weight 1,810, OH number 61; F=Polyester of adipic acid, hexane-1,6-diol and butane-1,6-diol of molecular weight 2,000, OH number 56; of adipic acid, phthalic acid, butane-1,4-diol and 1,1,1-trihydroxymethylpropane, OH number 213; H=Partially carbodiimidized 4,4'-diphenylmethane diisocyanate, NCO content 33 percent.

The tests in Table 2 are carried out in accordance with Example 4.

TABLE 2

| Polyether | Parts | Diol | Parts | Polyisocyanate | Parts | Solvent | Parts by volume | Solvent | Parts by volume | Catalyst | Parts | Temperature on addition of catalyst (°C.) | Stirring time (sec.) | Final heating (°C.) | Permeability to water vapor (mg./h./cm.²) |
|---|---|---|---|---|---|---|---|---|---|---|---|---|---|---|---|
| D | 20 | Butane-2,3-diol | 2.7 | Naphthylene-1,5-diisocyanate | 9.3 | Butyl acetate | 30 | Mineral spirit | 30 | Dibutyl tin dilaurate | 0.1 | 110 | 120 | 80 | 1.8 |
| E | 27 | Butane-1,4-diol | 2.7 | Hexamethylene-1,6-diisocyanate | 7.4 | Dioxane | 60 | do | 60 | do | 0.1 | 100 | 31 | 80 | 1.8 |
| E | 27 | do | 2.7 | do | 7.4 | Butyl acetate | 40 | Xylene | 60 | do | 0.1 | 100 | 25 | 80 | 1.7 |

Note.—D=Polypropylene glycol ether-(1,2) of molecular weight 2,000, OH number 56; E=Polybutylene glycol ether-(1,4) of molecular weight 2,700, OH number 41.5.

EXAMPLE 11

18.7 g. of a branched hexamethylene polycarbonate (prepared by ester interchange of 13 mols of hexane-1,6-diol and 1 mol of trimethylolpropane with 13 mols of diphenylcarbonate and having an OH number of 68.8) (23 mmol OH) and 4 g. of bishydroxy-ethoxybenzene-(1,4) (40 mmol OH) were dissolved in 60 ml. of butyl acetate at 100° C. and then 30 ml. of mineral spirits were added. After the addition of 8.3 g. of 4,4'-diphenylmethane-diisocyanate and 0.1 g. of diazabicyclooctane, the reaction mixture was stirred for 30 seconds at 100° C. and poured out on to a glass plate and the polyaddition was completed at 100° C. while the solvent was allowed to evaporate off at the same time. A microporous film was obtained which had a permeability to water vapour of 3.9 mg./h./cm.$^2$.

EXAMPLE 12

500 g. of a commercial polycaprolactone (OH number 56, molecular weight 2000) were reacted at 150° C. for one hour with 31 g. of a 75% solution of the product of addition of hexamethylene diisocyanate to bis-isocyanato-hexylurea in xylene/ethylene glycol acetate (1:1). 40 g. of this branched polyester (28.7 mmol OH) and 8 g. of bis-hydroxyethoxybenzene-(1,4) (80 mmol OH) were dissolved in a solvent mixture of 40 ml. xylene, 40 ml. of 1,2-dichloropropane and 40 ml. of mineral spirit at 90° C. After the addition of 15 g. (120 mmol NCO) of 4,4'-diphenylmethane diisocyanate, 500 mg. of diazabicyclo-octane were added and the reaction mixture was poured out on to a glass plate after 5 seconds and the solvent was evaporated off in a drying cupboard at a temperature of 80° C. A film which had a permeability to water vapour of 2.3 mg./h./cm.$^2$ was formed.

EXAMPLE 13

60 g. of a partially branched polyester of adipic acid and ethylene glycol (39 mmol CH), 0.6 g. of methyl diethanolamine (10 mmol OH) and 15 g. of bis-hydroxyethoxybenzene-(1,4) (150 mmol OH) were dissolved in 40 ml. of chlorobenzene and 140 ml. of xylene at 100° C. 27.4 g. (220 mmol NCO) of 4,4'-diphenylmethane-diisocyanate and 0.15 g. of diazabicyclo-octane were added and the reaction mixture was stirred for 16 seconds at 100° C., poured out on to a hot glass plate and immediately spread out. After completion of heat treatment at 100° C., a film which had a permeability to water vapour of 4.2 mg./h./cm.$^2$ was obtained. In comparison experiments, methyl diethanolamine was replaced by N,N-dihydroxyethyl-p-toluidine, triethanolamine and N,N-dihydroxyethyl aniline. Microporous films were obtained in each of these experiments.

The film prepared above was divided into four parts which were coloured by conventional methods using 2% aqueous solutions of Acid Blue 109, Acid Orange 10, Acid Black 1 and Acid Brown 85 respectively.

EXAMPLE 14

20 g. of a 10% solution of a commercial polyurethane in ethylacetate (made from a polyester of adipic acid and ethylene glycol of molecular weight 2000 and the isomeric mixture of 2,4- and 2,6-toluylene diisocyanate and having an OH content of 0.1%) and 36.4 g. (40 mmol OH) of a partly branched polyester of adipic acid and diethylene glycol (OH number 61.8) and 7.4 g. of 1,4-bis-(2-hydroxyethoxy)-naphthalene-(1,5) (60 mmol OH) were dissolved in 60 ml. of butyl acetate and 60 ml. of xylene at 95° C. After the addition of 13.7 g. (110 mmol NCO) of 4,4'-diphenylmethane diisocyanate and 0.4 g. of diazabicyclo-octane, the reaction mixture was stirred for 10 seconds and then poured on to a bonded Perlon fleece. After evaporation of the solvent at 80° C., a leathery structure which had a permeability to water vapour of 1 mg./h./cm.$^2$ was formed.

The tests of Table 3 were carried out in a manner analogous to Example 5.

TABLE 3

| Polyester | Parts Diol | | Polyisocyanate | | Solvent | | Polymer | | Catalyst | | Temperature on addition of catalyst | Stirring time (sec.) | Final heating at (°C.) | Permeability to water vapor (mg./h./cm.$^2$) |
|---|---|---|---|---|---|---|---|---|---|---|---|---|---|---|
| | | | Parts | | Parts | Parts by volume | Parts by volume | Polymer | Parts | Catalyst | | | | |
| C | 27 Butane-1,4-diol | 2 | 4,4'-diphenylmethane diisocyanate | 12 | Butylacetate | 60 | Xylene | 60 | Polyvinyl alcohol of K-value 60 | 0.1 | Diazabicyclo-octane | 60 | 180 | 20 | 8.4 |
| C | 20.0 ...do... | 3.3 | ...do... | 14.5 | Methylene chloride | 35 | Perchloroethylene | 170 | Thermoplastic polycarbonic acid ester of 4,4'-dihydroxy-2,2-diphenyl propane as 20% solution in methylene chloride; 50 g. | 3 | Triethylamine | 20 | 180 | 20 | 1.9 |

Note.—C=Polyester of adipic acid, diethylene glycol and 1,1,1-trihydroxymethylpropane of molecular weight 1,810, OH number 61.

EXAMPLE 15

20 g. of a 20% solution of a commercial, partly saponified copolymer of vinyl chloride and vinyl acetate in butyl acetate (OH number 84) (6 mmol OH) were dissolved with 36.4 g. (40 mmol OH) of a partly branched polyester of adipic acid and diethylene glycol (OH number 61.8) and 6 g. (60 mmol OH) of bis-(2-hydroxyethoxy)-benzene-(1,4) in 70 ml. of butyl acetate and 100 ml. of xylene at 100° C. After the addition of 14 g. (112 mmol NCO) of 4,4'-diphenylmethane-diisocyanate and 0.4 g. of diazabicyclooctane, the reaction mixture was stirred for 10 seconds at 100° C. and poured out on to a glass plate. After this solution had been heated at 100° C., a film which had a permeability to water vapour of 7 mg./h./cm.$^2$ was formed.

EXAMPLE 16

36.4 g. of a partly branched polyester of adipic acid and diethylene glycol (40 mmol OH) and 7.4 g. (60 mmol OH) of bis-hydroxy-ethoxy-naphthalene-(1,6) are dissolved in 70 ml. of butyl acetate and 90 ml. of xylene at 100° C.

212.5 g. of an OH-containing dimethyl polysiloxane (500 mmol OH) are dehydrated for one hour at 12 mm. Hg and 100° C., 84.1 g. (1000 mmol NCO) of hexamethylene diisocyanate-(1,6) are added and the reaction mixture is kept at 100° C. for 5 hours. A siloxane prepolymer which contained 7.2% of NCO (theoretical 7.08% was formed. 2.8 g. of this siloxane prepolymer was poured into the other solution prepared as described above, 0.4 g. of diazabicyclooctane was added, the reaction mixture was kept at 100° C. for 5 minutes 13.7 g. (110 mmol of NCO) of 4,4'-diphenylmethane diisocyanate were then added, the reaction mixture was stirred for 12 seconds and then poured out onto a glass plate, and the solvents were evaporated off at 100° C., polyaddition being completed at the same time. A film which had a permeability to water vapour of 3.4 mg./h./cm.$^2$ was formed.

EXAMPLE 17

40 g. of a polyester made from adipic acid and ethylene glycol (OH-number 56, molecular weight 2000) which has been chain-extended with 35 mol percent of triisocyanatohexyl-biuret, 0.1 g. of water and 2.5 g. of p-aminobenzylalcohol were dissolved in 40 ml. of acetone and 120 ml. of xylene and the mixture was heated to 56° C. 24 g. of 4,4'-diphenylmethane-diisocyanate, 0.2 g. of trimethylsilamorpholine and 0.2 g. of diazabicyclooctane were added. The mixture was stirred for 8 seconds and then poured onto a glass plate. The glass plate with the poured on mixture was heated to 100° C. after standing for 1 hour. A microporous film was obtained which had a permeability to water vapour of 2.5 mg./h./cm.$^2$, a tensile strength of 30 kp./cm.$^2$, elongation at break of 250%, and a tear propagation resistance of 4.0 kp./cm.

EXAMPLE 18

18.2 g. of a polyester as described in Example 3 (20 mmol OH), 4.5 g. p-aminobenzoic acid ethylene glycol-ester (25 mmol OH and 25 mmol NH) and 4 g. of a filler which was prepared by burning silicon tetrachloride (volume 17.4 ml./g.; surface area according to BET measured with nitrogen: 200) were dissolved in 40 ml. of dioxane and 90 ml. of xylene. At a temperature of 70° C. 9.7 g. of 4,4'-diphenylmethane-diisocyanate (77 mmol NCO) and 0.2 g. diazabicyclooctane were added. The mixture was stirred for 15 seconds, poured on to a glass plate and transformed into a microporous film by evaporating the solvents at 100° C. The film had a permeability to water vapour of 12 mg./h./cm.$^2$.

It is to be understood that any system of reactants for preparing polyurethanes which will produce a polyurethane having a Shore A hardness of at least 50 and a tensile strength of at least 50 kp./cm.$^2$ may be substituted in the examples for the specific formulations set forth therein.

What is claimed is:

1. A process for the preparation of polyurethane microporous sheet structures which comprises reacting an organic compound having at least two terminal hydroxyl groups and a molecular weight of from about 500 to about 10,000, a chain extending agent having at least two hydroxyl or amino groups and a molecular weight of from about 50 to about 600, the reactivity of the groups of said chain extending agent being within a factor of 5 as compared to the reactivity of the compound having a molecular weight of from about 500 to about 10,000 and an amount of an organic polyisocyanate such that the NCO to hydroxyl or NCO to amino plus hydroxyl ratio is from about 0.8 to about 2, to produce a polyurethane which in the homogeneous state exhibits a Shore A hardness of at least 50 and a tensile strength of at least 50 kc./cm.$^2$, said reaction being conducted in a 10 to 80 percent by volume solution in a solvent or mixture of solvents at a temperature up to 150° C., the solvent or mixture of solvents being one that (a) dissolves the starting materials at the initial reaction temperature, (b) dissolves the polyurethane formed as a result of the reaction with increasing difficulty as the degree of polyaddition increases and finally permits the polyurethane to gel at the reaction conditions after not more than 20 minutes, (c) has substantially no swelling effect upon the completed polyurethane product and (d) has an evaporation number sufficiently high to insure that under the reaction conditions the solvent will still be present in sufficient quantity when the film solidifies, applying the solution to a substrate while it is still pourable and removing the solvent while maintaining the polyaddition at a temperature below the softening point of the polyurethane.

2. The process of claim 1 wherein a mixture of solvents is used, said mixture comprising a first solvent for the reactants, said first solvent being one that the polyurethane formed absorbs more than 50 percent by weight by swelling and a second solvent being one that the polyurethane formed absorbs less than 50 percent by weight by swelling, said first solvent having a smaller evaporation number than the second solvent.

3. The process of claim 1 wherein the reactants are continuously mixed and applied to a porous substrate.

4. The process of claim 1 wherein the reactants are continuously mixed and applied to a nonporous substrate.

References Cited

UNITED STATES PATENTS

| | | | |
|---|---|---|---|
| 3,348,963 | 10/1967 | Fukushima et al. | 117—161X |
| 3,491,053 | 1/1970 | Sommer et al. | 117—161X |

FOREIGN PATENTS

| | | | |
|---|---|---|---|
| 705,612 | 3/1968 | Belgium | (Abstract) |
| 1,150,995 | 5/1969 | Great Britain | 260—2.5AY |

WILLIAM D. MARTIN, Primary Examiner

D. COHEN, Assistant Examiner

U.S. Cl. X.R.

117—161; 260—2.5